United States Patent [19]

Cretin et al.

[11] Patent Number: 4,855,732
[45] Date of Patent: Aug. 8, 1989

[54] SYSTEM FOR THE TRANSMISSION OF SIGNALS BETWEEN A RECEPTION ASSEMBLY LOWERED INTO A WELL AND A CENTRAL CONTROL AND RECORDING LABORATORY

[75] Inventors: Jacques Cretin, Parly; Daniel Saussier, Epone, both of France

[73] Assignee: Institut Francais du Petrole, Rueil-Malmaison, France

[21] Appl. No.: 174,354

[22] Filed: Mar. 28, 1988

[30] Foreign Application Priority Data

Mar. 27, 1987 [FR] France ............................ 87 04.365

[51] Int. Cl.$^4$ ............................ G01V 1/40; H01P 3/06
[52] U.S. Cl. .................................. 340/856; 367/81; 174/115; 333/243
[58] Field of Search ............ 340/853, 856, 857, 861; 367/81; 333/1, 101, 117–119, 243; 178/63 R; 174/115

[56] References Cited

U.S. PATENT DOCUMENTS

| | | | |
|---|---|---|---|
| 3,514,750 | 5/1970 | Pritchett et al. | 340/853 |
| 3,773,109 | 11/1973 | Eberline | 174/115 |
| 4,028,660 | 6/1977 | Pitts, Jr. | 340/856 |
| 4,592,033 | 5/1986 | Dennis | 340/853 |
| 4,770,034 | 9/1988 | Titchener et al. | 340/857 |

*Primary Examiner*—Thomas H. Tarcza
*Assistant Examiner*—Ian J. Lobo
*Attorney, Agent, or Firm*—Antonelli, Terry & Wands

[57] ABSTRACT

A system is provided for transmitting signals between a sensor assembly contained in one or more well probes lowered into a well at the end of a cable and a surface control and recording unit. The cable includes a central line surrounded by several other lines and an external metal sheath. The transfer of data from the reception assembly to the surface installation is provided by applying suitably coded signals between the central conductor and the external sheath. A considerable increase in the transmission flow rate of the cable is obtained.

7 Claims, 2 Drawing Sheets

SYSTEM FOR THE TRANSMISSION OF SIGNALS BETWEEN A RECEPTION ASSEMBLY LOWERED INTO A WELL AND A CENTRAL CONTROL AND RECORDING LABORATORY

BACKGROUND OF THE INVENTION

1. Field of the Invention

The present invention relates to a system for the transmission of signals between a signal reception assembly lowered into a well and a central control and recording unit disposed outside the well. The transmission system of the invention is more particularly suitable for a signal reception assembly comprising an acquisition device adapted for collecting signals received by sensors disposed in a well, digitizing them and translating them into coded form for transmission thereof. 2. Description of the Prior Art Measures in bore holes are made using sensors generally contained in at least one probe lowered from the surface at the end of an electric supporting cable. The probe includes one or more arms actuated by hydraulic jacks associated with a system delivering a pressurized fluid. Opening of these arms, which anchor themselves in the wall of the well and thus immobilize the probe at a depth where measurements are to be made, is controlled from the surface installation using different conducting lines of the support cable. Either an electric current for feeding an electric motor and thus compressing the hydraulic fluid by operation of the jacks, or an electric signal for actuating control solenoid valves are transmitted from the surface installation. A probe may also be used for example having anchorage arms actuated by springs held under tension by bolts. Hydraulic means, controlled by opening solenoid valves, cause unlocking and opening of the arms. These solenoid valves are controlled by transmitting, from the surface installation, electric signals over a conducting line of the support cable.

Such probes are described for example in U.S. Pat. Nos. 4,428,422 or 4,616,703.

The different sensors disposed in the well for making measurements may be disposed in a single probe or else in an assembly of probes comprising a main probe under which a plurality of satellite probes are suspended at different depths. Such a probe assembly is described for example in French patent No. 2 564 599.

Thus an assembly of sensors is obtained spaced apart over a depth which may reach several tens even several hundreds of meters, which makes it possible for example to carry out seismic prospection operations; with a seismic source tripped at the surface or in another well, for example, the acoustic signals reflected back by the discontinuities of the subsoil are received by different sensors, and these signals are used so as to obtain seismic sections of the subsoil.

Transmission of the different signals picked up to a surface seismic recording unit may take place in analog form when the number of sensors is relatively small. But when the reception assembly comprises a higher number (more than six for example taking into account the type of cable used in practice) digitized and coded transmission is generally used by adapting the transfer rate to the capacities of the transmission cable supporting the probe.

From the U.S. Pat. No. 4,355,310 a digitized signal transmission system is known making it possible to connect well probes containing sensors of very different kinds: acoustic, nuclear, etc, to a control unit disposed on the surface. All the data connected by the different sensors are digitized and centralized by a control member disposed in the vicinity. The connection between the central control and recording device disposed on the surface, is provided by means of modems connected to transmission lines of the cable. The speed of transmitting the coded signals is adapted to the possibilities of the cable used. It is generally of the order of a few tens of kilobits/sec and depends on the type of coding used. It is generally the transmission rate made possible by the transmission cables used for connecting the well probes to a surface installation.

One of the cable patterns most generally used includes seven parallel lines. Six lines are distributed evenly about a central line. A metal sheath in the form of a braid is disposed at the periphery of the cable so as to give it mechanical strength and withstand tractive forces. The transmission of coded digitized signals is achieved using certain lines at the periphery of the central line.

The prospection methods developed at the present time for increasing the speed of seismic exploration of underground profiles lead to using complex reception devices having a large number of seismic receivers distributed very often in several probes stepped at different depths, so as to multiply the number of positions where waves are picked up simultaneously for recording thereof. The volume of data to be transmitted increases considerably.

In some cases where the acquisition time of the signals is short with respect to the time interval between two transmission-reception cycles, the acquired data may be stored in a storage means of one of the probes and their transmission to a surface recording system is delayed. But very often the data acquisition is carried out practically continuously.

This is true particularly for certain vibroseismic applications where the interruption time intervals between the successive acquisition periods are too short to contemplate delayed transmission. It is therefore imperative for the data to be transmitted in real time and so for the flow rate of the transmission cables to be considerably increased;

The system of the invention avoids the above drawbacks.

SUMMARY OF THE INVENTION

The present system allows signals to be transmitted between on the one hand, a signal receiver assembly lowered into a well and including an acquisition device adapted for collecting signals picked up, digitizing them and translating them into a coded form and, on the other hand, a central control and recording unit disposed outside the well, comprising a multiconductor cable for supporting the reception assembly and transmitting electric energy as well as control signals emitted by the central unit and data emitted by the receiver assembly, and the cable comprising a central conductor, a plurality of conductors disposed thereabout and a metal sheath. It further comprises means for transmitting and receiving signals in accordance with a bipolar code and connected between the central conductor and the metal sheath for transmitting high speed digitized data between the acquisition device and the control and recording unit.

The transmission and reception means include for example a synchronization element and a clock element for timing the digitization and the transmission of data between the central conductor and the metal sheaths at a frequency greater than 100 Kbits per second.

With such an arrangement, the flow of data transmitted may reach 200 and even 300 kilobits/second, if a suitable transmission code is chosen and so the transmission may take place in real time as the digitization proceeds.

Thus a very high transmission rate is obtained which makes it possible to increase the number of seismic sensors used without extending the time for transmitting the collected signals. Thus the use of buffer memories is avoided which are generally used for palliating an insufficient transmission speed and in particular makes possible vibro-seismic applications with a long transmission time where the transmission of data to the surface recording systems must take place in real time.

For applications other than seismic prospection where a large but discontinuous data flow is to be collected, the increase in the transmission rate makes it possible to reduce the time interval between successive acquisition periods.

It should also be noted that the transmission rate which it is possible to obtain between the central line and the sheath frees the other annular lines for conveying electric currents, control or synchronization signals or to increase the number of sensors in the probe measuring the temperature, the pressure, etc, which may use their own lines for the transfer of analog data.

BRIEF DESCRIPTION OF THE DRAWINGS

Other features and advantages of the system will be clear from reading the description of one embodiment given by way of non limitative example, with reference to the accompanying drawings in which.

DESCRIPTION OF THE PREFERRED EMBODIMENT

Figure 1:
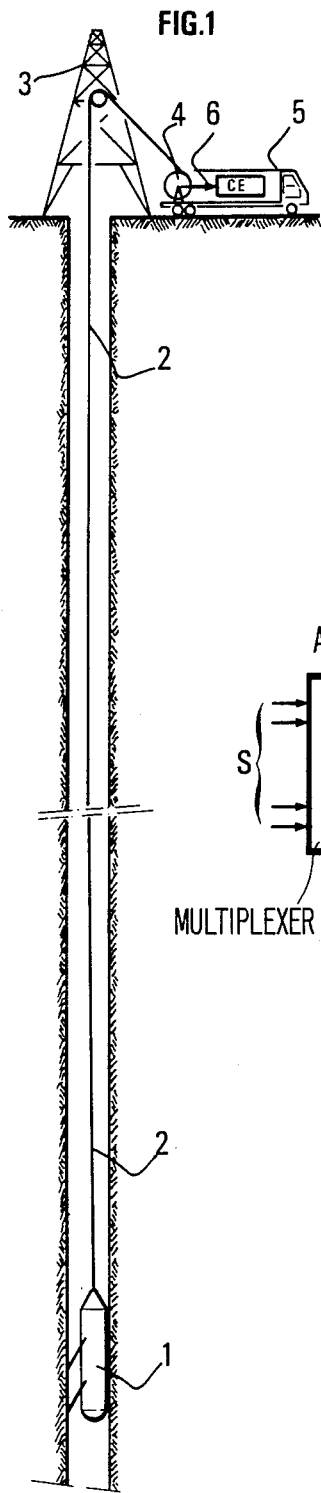
FIG. 1 shows a probe lowered into a well, suspended from an electric support cable.

The system of the invention makes it possible to transmit signals between a signal reception assembly contained in at least one probe 1 (FIG. 1) which is for example of the type described in the above cited U.S. Pat. Nos. 4,428,422, 4,616,003 and a surface installation. This probe is suspended by an electric carrying cable 2 from a support structure 3 disposed on the surface and wound on a storage reel 4 or a recording truck 5. The cable 2 used is the one which generally serves for lowering the well probes. It comprises for example (FIG. 2) seven conductors or lines $L_1$ to $L_7$. The six lines $L_1$ to $L_6$ are disposed evenly throughout the section of the cable at the same distance from the centre where a central line $L_7$ passes. At the periphery, the cable includes a metal sheath T generally formed of a braid. The seven lines $L_1$ to $L_7$ of cable 1 wound on the storage reel 4 (FIG. 1) are connected by a transmission cable 6 to a control and recording unit CE disposed in the recording truck 5.

Numerous tests have been carried out to try and find the combination of lines giving the best data flow over a cable of variable length (from 3 km to 7 km for example) and which, for the desired transmission flow rates, was insensitive to the variations of the signal transmission characteristics of the cables generally used. Different arrangements in which the lines are connected in parallel in twos or in threes have increased the capacities of the cable. The combination which proved the best is the one in which the coded signals are transmitted between the central cable $L_7$ and the external metal sheath T. Using this particular combination, flow rates of 128 kilobits per second (kbits/s) are currently obtained whatever the cable and by optimizing the transmission factors flow rates of 300 kbits/s and even more can be reached over cable lengths which may reach several kilometers, provided that a bipolar transmission code is used such as the code HDB3 well known by specialists.

Figure 3:
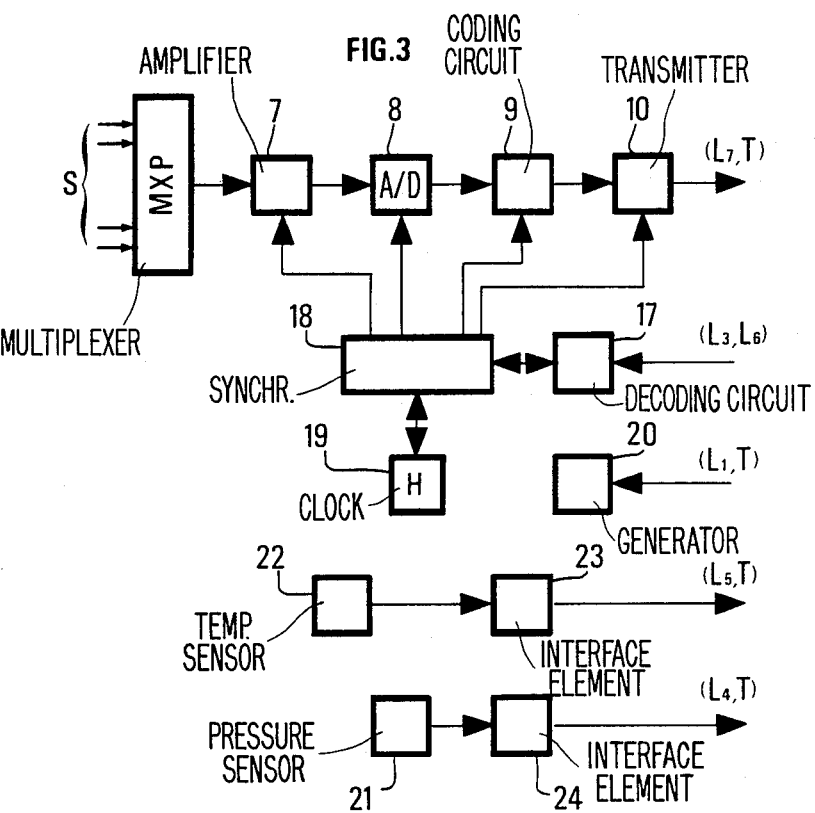
FIG. 3 shows an electronic unit for acquiring measurements made in a well and transmission thereof over a multiline cable.

The combination of electric conductors chosen is all the more advantageous since it only requires a single conductor ($L_7$) associated with the external braid T and so the other six lines are available for the electric currents supplying the apparatus contained in the probe and for the transmission of signals. One example of using the different lines of the cable is shown in FIG. 3. The signals S measured by the probe sensors (seismic signals for example) are applied to a variable gain amplifier 7 such as those described for example in the published French patent applications Nos. 2,593,004 or 2,592,537 generally by means of a multiplexer MXP.

Figure 2:
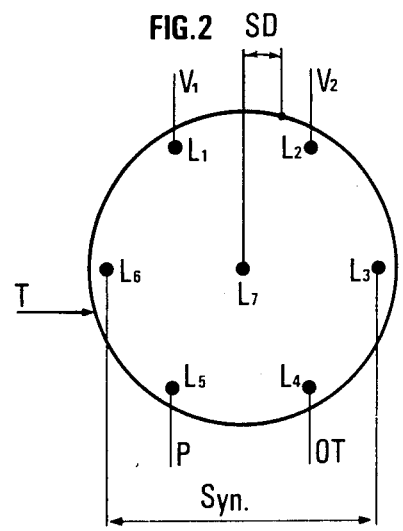
FIG. 2 shows in section an electric supporting transmission cable generally used for supporting well probes.

The amplified and sampled signals are applied to an A/D converter 8. The corresponding digitized signals are coded by specialized circuits 9 of a current type in a bipolar code such as the code HDB3 well known by specialists, before being applied to a transmission element 10 which is connected to the central line $L_7$ and to the peripheral braid T (FIG. 2)

Figure 4:
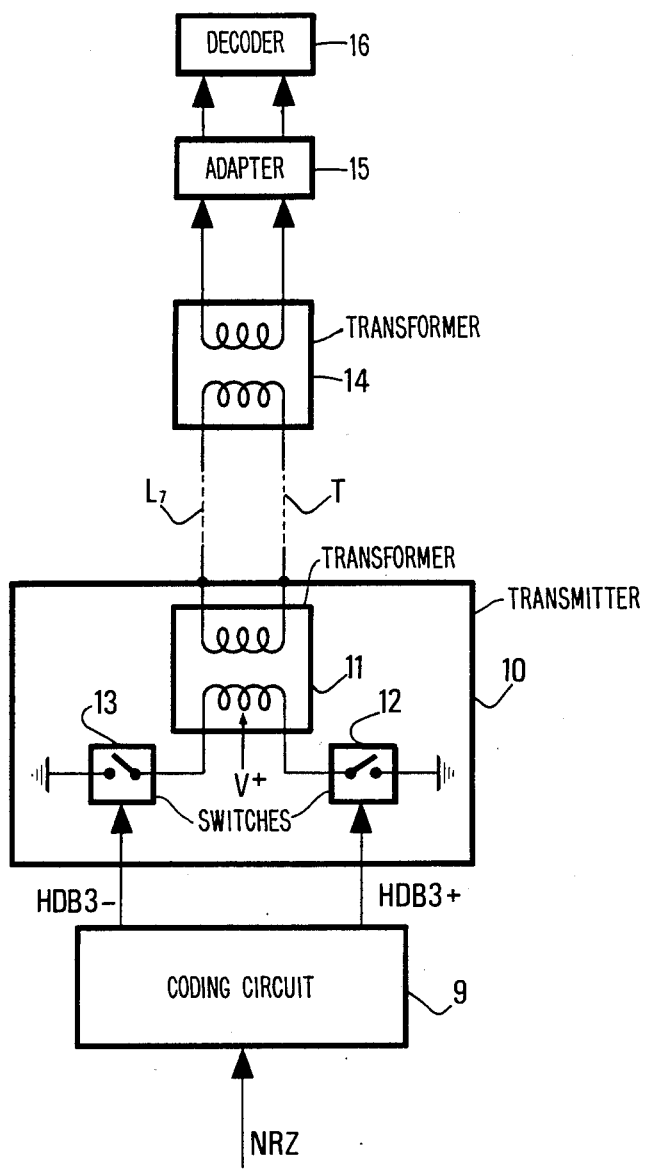
FIG. 4 shows one example of a transmitter for applying coded signals to the central line and to the cable sheath.

The transmission element 10 includes for example (FIG. 4) a transformer 11 in which both ends of the primary winding are connected to ground through electronic switches respectively 12 and 13. The middle point of the primary winding is connected to a positive electric voltage V+. The respective signals for controlling the switches, one positive, the other negative, are delivered by the coding element 9. The secondary winding of the voltage transformer 11 is connected between the central line $L_7$ and the peripheral braid T. The signal received is applied to a receiver-adapter 15 of known type and then to a decoder HDB3 16 which reconstitutes the digitized signal transmitted.

The other lines $L_1$ to $L_6$ of cable 2 are available for other uses. Through the lines $L_3$ and $L_6$, for example, a synchronization signal is transmitted. The reception device in the well includes a decoder 17 (FIG. 3) and a synchronization unit 18. At a timing fixed by a clock element 19, this unit generates signals for varying the gain of the amplifier 7 and for sequencing the operations for digitizing the signals to be measured and to be transmitted. The electronic elements of the reception device are fed by an electric voltage generator 20 receiving the electric energy transmitted from the surface over line $L_1$ and the external braid T. Lines $L_4$ and $L_5$ are available for other signals. Analog signals delivered for example by elements measuring the pressure and the temperature 21, 22 and shaped for transmission by interface elements 23, 24 may be transmitted directly and permanently to the surface recording unit via lines L$_4$ and L$_5$ or for transmitting control signals in the opposite direction. Similarly, the return of these signals takes place through the peripheral braid T. Through lines L$_2$, motors are fed electrically for creating the hydraulic energy required for opening the anchorage arms of the probe 1 or else for actuating electrovalves, not shown.

What is claimed is:

1. In a system for connecting a probe lowered in a well to a control and recording unit outside the well through a multi-conductor supporting cable for transmission of signals and electric current:
    said probe including:
        a first sensor means and a second sensor means;
        an acquisition device for collecting signals picked up by said first sensor means;
        means for digitizing and for translating the collected signals into a coded form; and
        a motor means;
    said multi-conductor cable including a central conductor, a plurality of external conductors disposed around said central conductor and an outer metal sheath surrounding said external conductors;
    said system comprising:
        a further means including said external conductors for transmitting signals from said second sensor means to said control and recording unit and for transmitting control signals from said control and recording unit to said probe;
        generating means outside the well connected with at least one of said external conductors for supplying operating power to said motor means in said probe;
        coding means in said probe for conversion of digitized signals in accordance with a bipolar code; and
        a decoding means in said control and recording unit with output signals from said coding means being connected between said central conductor and said outer metal sheath for transmission of coded signals to said decoding means whereby to provide an increased flow rate of coded signals through said cable.

2. The system as claimed in claim 1, wherein said coding means includes a synchronization member and a clock member for timing the digitization and the transmission of data between the central conductor and the metal sheath at a frequency greater than 100K bits per second.

3. The system as claimed in claims 1 or 2 wherein said further means that are connected between said external conductors includes also a connection to said metal sheath.

4. The system as claimed in claim 1 wherein said coding means and said decoding means include voltage transformers located at the probe and at the recording unit respectively that are each connected between the central conductor and said outer sheath.

5. The system as claimed in claim 1 wherein the cable includes at least one external conductor for supplying electric power to said electronic units in said probe, at least one external conductor for transmitting control signals to said probe and at least one further external conductor for the direct transmission of signals from said second sensor means in the probe to the control and recording unit.

6. The system as claimed in claim 1 comprising a means in said acquisition device for coding digitized data in HDB3 code and means in said control and recording unit for decoding data coded in HDB3 code after transmission.

7. A system for providing an increased flow rate of coded signals through a multiconductor cable connected between a coding means in a probe lowered in a well and a decoding means in a control and recording unit outside the well;
    said multiconductor cable serving to support said probe and including a central conductor, an outer metal sheath and a plurality of external conductors disposed inside said sheath and remote said central conductor;
    said probe including first and second sensors, an acquisition device connected for collecting signals picked up by said first sensor, means including said coding means for digitizing and translating the collected signals into a coded form and for connecting said coded signals between the central conductor and the outer metal sheath of said multiconductor cable and a motor;
    said system further comprising:
    a first means for transmitting signals from said second sensor to said control and recording unit on at least one of said external conductors;
    a second means for transmitting control signals from said control and recording unit to said probe on another of said external conductors; and
    generating means outside said well connected to yet another of said external conductors for supplying electric current to said motor.

* * * * *